United States Patent
Zhou (10) Patent No.: US 10,089,150 B2
(45) Date of Patent: Oct. 2, 2018

(54) APPARATUS, DEVICE AND METHOD FOR ALLOCATING CPU RESOURCES

(71) Applicant: Alibaba Group Holding LImited, George Town, Grand Cayman (KY)

(72) Inventor: Zhiyuan Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 45 days.

(21) Appl. No.: 15/014,744

(22) Filed: Feb. 3, 2016

(65) Prior Publication Data

US 2016/0224387 A1     Aug. 4, 2016

(30) Foreign Application Priority Data

Feb. 3, 2015    (CN) .......................... 2015 1 0055803

(51) Int. Cl.
G06F 9/46       (2006.01)
G06F 9/50       (2006.01)

(52) U.S. Cl.
CPC .......... G06F 9/5066 (2013.01); G06F 9/5027 (2013.01)

(58) Field of Classification Search
None
See application file for complete search history.

(56) References Cited

U.S. PATENT DOCUMENTS

| | | | |
|---|---|---|---|
| 4,354,227 A | 10/1982 | Hays, Jr. et al. | |
| 4,847,755 A | 7/1989 | Morrison et al. | |
| 5,325,525 A | 6/1994 | Shan et al. | |
| 5,787,453 A | 7/1998 | Kennedy | |
| 5,897,649 A | 4/1999 | Kennedy | |
| 6,321,341 B1* | 11/2001 | Kamijo | G06F 1/28 365/227 |
| 6,360,263 B1 | 3/2002 | Kurtzberg et al. | |
| 6,389,331 B1* | 5/2002 | Jensen | G05B 23/0213 700/275 |
| 6,460,122 B1 | 10/2002 | Otterness et al. | |
| 6,915,516 B1* | 7/2005 | Glidewell | G06F 9/4843 718/100 |
| 7,036,123 B2 | 4/2006 | Dorofeev et al. | |
| 7,152,124 B1 | 12/2006 | Puri et al. | |
| 7,594,229 B2 | 9/2009 | Hirschsohn | |
| 7,933,855 B2 | 4/2011 | Nauck et al. | |
| 8,112,527 B2 | 2/2012 | Kawato | |
| 8,175,863 B1 | 5/2012 | Ostermeyer et al. | |
| 8,230,426 B2 | 7/2012 | Powers et al. | |
| 8,645,965 B2 | 2/2014 | Zimmer et al. | |

(Continued)

FOREIGN PATENT DOCUMENTS

WO     2014032477     3/2014

*Primary Examiner* — Dong Kim (57) ABSTRACT

A method of central processor unit (CPU) resource allocation for a multi-processor device includes the step of obtaining the amounts of demanded CPU resources for the process groups executing on the multi-processor device during a pre-configured time period. The method also includes the step of obtaining the amounts of idle CPU resources for the CPUs of the multi-processor device during the pre-configured time period. The method further includes the step of allocating the CPUs to the process groups based upon the obtained amounts of demanded CPU resources for the process groups and the obtained amounts of idle CPU resources for the CPUs.

21 Claims, 8 Drawing Sheets

(56) References Cited

U.S. PATENT DOCUMENTS

| | | |
|---|---|---|
| 8,667,500 B1 | 3/2014 | Ji et al. |
| 8,683,466 B2 | 3/2014 | Seeniraj et al. |
| 8,881,164 B2 | 11/2014 | Martinka et al. |
| 2002/0078121 A1 | 6/2002 | Ballantyne |
| 2002/0087614 A1 | 7/2002 | Kocev et al. |
| 2002/0087652 A1 | 7/2002 | Davis et al. |
| 2002/0161817 A1 | 10/2002 | Dorofeev et al. |
| 2003/0069916 A1 | 4/2003 | Hirschsohn |
| 2003/0163512 A1* | 8/2003 | Mikamo ............ G06F 9/5066 718/102 |
| 2004/0111596 A1 | 6/2004 | Rawson, III |
| 2004/0123297 A1* | 6/2004 | Flautner ............ G06F 1/3203 718/102 |
| 2005/0120160 A1 | 6/2005 | Plouffe et al. |
| 2005/0229178 A1 | 10/2005 | Ballantyne |
| 2005/0229179 A1 | 10/2005 | Ballantyne |
| 2007/0061108 A1* | 3/2007 | DeWitt ............ G06F 11/3423 702/183 |
| 2007/0177195 A1 | 8/2007 | Rebert et al. |
| 2007/0240161 A1 | 10/2007 | Prabhakar et al. |
| 2007/0288728 A1* | 12/2007 | Tene ............ G06F 11/3423 712/227 |
| 2008/0016508 A1* | 1/2008 | Goto ............ G06F 9/5088 718/102 |
| 2009/0049443 A1 | 2/2009 | Powers et al. |
| 2009/0119301 A1 | 5/2009 | Cherkasova et al. |
| 2009/0172690 A1 | 7/2009 | Zimmer et al. |
| 2009/0260008 A1 | 10/2009 | Cho et al. |
| 2009/0327944 A1* | 12/2009 | Sugure ............ G06F 17/5022 715/772 |
| 2010/0095137 A1* | 4/2010 | Bieswanger ......... G06F 1/3203 713/300 |
| 2010/0175066 A1* | 7/2010 | Paik ............ G06F 1/3203 718/102 |
| 2010/0182635 A1 | 7/2010 | Rebert et al. |
| 2011/0145153 A1 | 6/2011 | Dawson et al. |
| 2011/0219208 A1 | 9/2011 | Asaad et al. |
| 2012/0260179 A1 | 10/2012 | Reshadi et al. |
| 2013/0007413 A1* | 1/2013 | Thomson ............ G06F 1/324 712/30 |
| 2013/0074085 A1* | 3/2013 | Thomson ............ G06F 1/3203 718/102 |
| 2013/0151879 A1* | 6/2013 | Thomson ............ G06F 1/329 713/322 |
| 2013/0223265 A1 | 8/2013 | Yomo et al. |
| 2013/0339975 A1 | 12/2013 | Busaba et al. |
| 2014/0038002 A1 | 2/2014 | Kumeuchi et al. |
| 2014/0108828 A1* | 4/2014 | Breternitz ............ G06F 1/329 713/300 |
| 2014/0149992 A1 | 5/2014 | Zimmer et al. |
| 2014/0173595 A1 | 6/2014 | Anand et al. |
| 2014/0201757 A1 | 7/2014 | Bird et al. |
| 2014/0331222 A1 | 11/2014 | Zheng |
| 2014/0344393 A1 | 11/2014 | Rebert et al. |
| 2015/0178879 A1 | 6/2015 | Palmer et al. |
| 2016/0026589 A1 | 1/2016 | Kolor et al. |

\* cited by examiner

APPARATUS, DEVICE AND METHOD FOR ALLOCATING CPU RESOURCES

CROSS REFERENCE TO RELATED APPLICATION

This application claims the benefits to Chinese Patent Application No. 201510055803.1, filed on Feb. 3, 2015, which is incorporated herein by reference in its entirety.

TECHNICAL FIELD

The present invention relates generally to the field of computer hardware, and more particularly to a method, apparatus and device for allocating CPU resources.

BACKGROUND

Servers are essential components of networking technology, receiving visits from users numbered in a multitude ranging from tens to thousands or even tens of thousands. As a result, servers tend to face performance demands in terms of high throughput of a large amount of data, extremely high level of stability, long execution hours, etc. For a large amount of computation, servers servicing at a department level or enterprise level generally support central processor unit (CPU) parallel processing. Parallel processing refers to a server having multiple CPUs executing at the same time, which greatly enhances the data processing power of the server. Presently, high performance servers are generally equipped with multiple CPUs.

The technology of CPU parallel processing is applied to scenarios where, for example, a server is installed with multiple programs (tasks), each program capable of being executed in parallel with each other. With such a server executing multiple programs, each program corresponds to a process group, which includes one or more processes. The multiple process groups share the hardware resources provided by the same server. During the process of multiple programs running in parallel, to prevent the process groups from interfering with each other's execution or generating variances in performance, it is necessary to isolate the CPU resources utilized by the process groups corresponding to the multiple programs. In an ideal situation, allocating independent resources for each process group can guarantee that the CPU resources can be successfully isolated for the process groups. But, independent allocation of CPU resources leads to parts of the allocated CPU resources being under-utilized and consequently causing the waste of CPU resources.

To increase the usage rate of CPU resources, a CPU is assigned to execute two or more process groups such that it is shared among multiple process groups, i.e., CPU resources are over-provisioned. Over-provisioning is one of the mechanisms that help attaining a balance between achieving CPU resource isolation and CPU resource usage efficiency.

When utilizing the over-provisioning mechanism to allocate CPU resources to process groups, the prior art technology pins the process groups to a particular CPU or CPU clusters for execution. With the different demands for CPU resources by different programs and the different demands for CPU resources by a process group at different points of execution, the pinning method can easily lead to some CPUs being overloaded with too many busy programs, while other CPUs are under-loaded with less programs, i.e., there is an imbalance among the usage of each CPU. In an environment of multiple process groups where the CPU resources are shared by multiple process groups, when one or more CPUs have a heavy workload, the functionality of the programs executing on those CPUs is likely to experience degraded variance in terms of performance.

Therefore, there exists a need for solving the problems of imbalanced CPU usage in an environment of parallel processing in servers.

SUMMARY

According to an exemplary embodiment of the present disclosure, a method of central processor unit (CPU) resource allocation for a multi-processor device is disclosed. One embodiment includes the step of obtaining the amounts of demanded CPU resources for the process groups executing on the multi-processor device during a pre-configured time period. The method also includes the step of obtaining the amounts of idle CPU resources for the CPUs of the multi-processor device during the pre-configured time period. The method further includes the step of allocating the CPUs to the process groups based upon the obtained amounts of demanded CPU resources for the process groups and the obtained amounts of idle CPU resources for the CPUs.

According to another exemplary embodiment of the present disclosure, an apparatus for allocating CPU resources includes an obtaining module and an allocation module. The obtaining module is configured to obtain the amounts of demanded CPU resources for the process groups executing on the multi-processor device and the amounts of idle CPU resources for the CPUs of the multi-processor device during a pre-configured time period. The allocation module is configured to allocate the CPUs to the process groups based upon the obtained amounts of demanded CPU resources for the process groups and the obtained amounts of idle CPU resources for the CPUs.

According to yet another exemplary embodiment of the present disclosure, an electronic device for allocating CPU resources includes a memory and a plurality of processors having a plurality of process groups executing thereon. The CPU resources are allocated for the plurality of process groups by a CPU resource allocation method. The method includes the step of obtaining the amounts of demanded CPU resources for the process groups executing on the multi-processor device during a pre-configured time period. The method also includes the step of obtaining the amounts of idle CPU resources for the CPUs of the multi-processor device during the pre-configured time period. The method further includes the step of allocating the CPUs to the process groups based upon the obtained amounts of demanded CPU resources for the process groups and the obtained amounts of idle CPU resources for the CPUs.

Compared to the prior art technologies, the present disclosure provides a method, apparatus and device for allocating CPU resources through obtaining the amount of demanded CPU resources for each process group executing on a multi-processor device, and the amount of idle CPU resources for each CPU of the multi-processor device during the pre-configured time period. Based on the obtained amount of the demanded CPU resources for each process group and the obtained amount of idle CPU resources for each CPU during the pre-configured time period, each process group is allocated a required amount of CPUs. Because the present disclosure bases the allocation of CPU resources for each process group on the amount of resources demanded by each process group and the amount of each CPU's idle resources, the CPU resources allocated are as balanced as possible among the multiple process groups. Therefore, the usage rates of each of the CPUs are also balanced to guarantee the performance of each program executing thereon, increasing the overall efficiency of resources usage rate and improving the overall system performance.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-11. However, those skilled in the art will readily appreciate that the detailed description given herein with respect to these figures is for explanatory purposes as the disclosure extends beyond these limited embodiments.

The present disclosure provides a method of allocating CPU resources for the process groups executing on a multi-processor device based on the amount of demanded CPU resources for the process groups and the amount of idle CPU resources for the CPUs of the multi-processor device during a pre-configure time period. By use of a presently available amount of CPU resources at each CPU in addition to the demanded amount of CPU resources by each process group, the present disclosure provides a method of dynamic allocation of CPU resources.

Figure 1A:
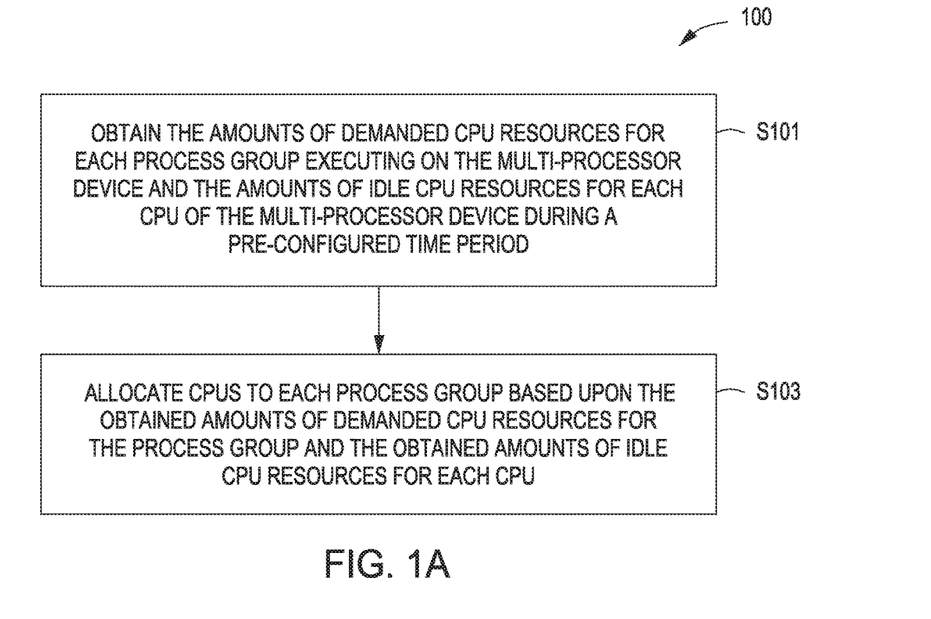
FIG. 1A is a flow chart of a method of allocating CPU resources in accordance with embodiments of the present disclosure.

Referring to FIG. 1A, a flow chart of a method of allocating CPU resources is shown in accordance with embodiments of the present disclosure. The method 100 starts in step S101, where the amount of demanded CPU resources for each process group executing on a multi-processor device during a pre-configured time period and the amount of idle CPU resources for each CPU of the multi-processor device during the pre-configured time period are obtained.

For each process group executed by the multi-processor device, with both the amount of demanded CPU resources and the amount of idle CPU resources for each CPU of the multi-processor device obtained by the above described methods, method 100 proceeds to step S103 to allocate CPU resources for each process group.

In step S103, based on the amount of demanded CPU resources by each process group during the pre-configured time period and the amount of idle CPU resources for each CPU during the pre-configured time period, the amount of demanded CPU resources are allocated to each process group.

The present disclosure provides for a dynamic allocation of CPU resources. Two exemplary implementations are described in the following. First, an overall CPU resource allocation strategy is generated for all the process groups, after which a uniformed provisioning is implemented according to the strategy. Second, the CPU resources to be allocated for a process group is determined, after which by use of provisioning tools the process group is pinned to its respectively allocated CPU resources. The same allocation and provisioning process is repeated for each process group of the plurality of process groups. In other words, each CPU resource allocation for a process group is followed by the provisioning of the allocated resources to that particular process group. It is understood that the above described exemplary ways are mere variations in implementation, all of which are within the scope of the present disclosure.

Figure 1B:
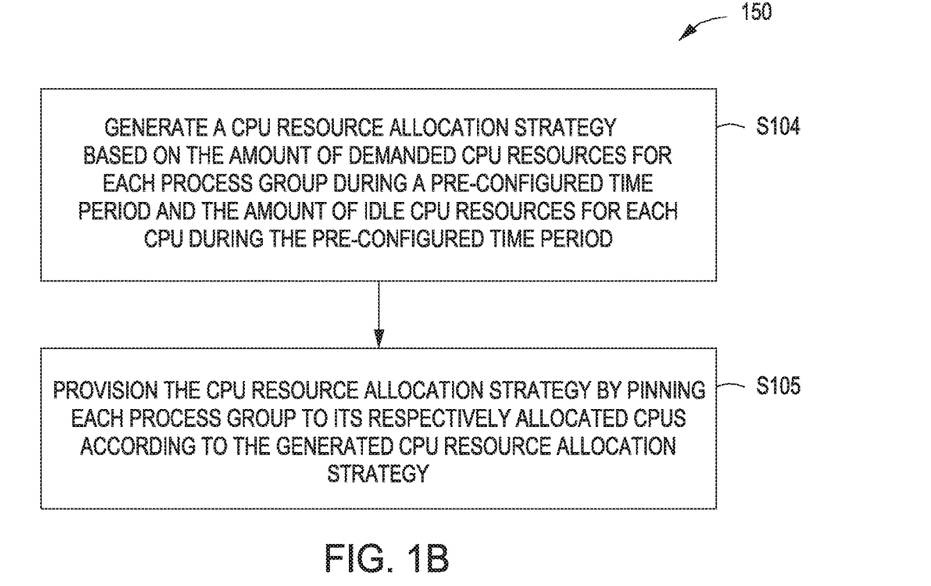
FIG. 1B is a flow chart of method of the step S103 of FIG. 1A in accordance with embodiments of the present disclosure.

Referring to FIG. 1B, method 150 implementing the above described first approach of CPU resource provisioning is shown in accordance with embodiments of the present disclosure. Method 150 starts in step S104, where a CPU resource allocation strategy is generated based on the amount of demanded CPU resources for each process group during a pre-configured time period and the amount of idle CPU resources for each CPU during the pre-configured time period. Various implementations can be utilized to implement various allocation strategies, all of which are within the scope of the present disclosure.

Different CPU resource allocation strategies have different effects for dynamic CPU resource balancing. The effect of a CPU resource allocation strategy on dynamic balancing of CPU usage can be evaluated with various standards such as mean-square error, etc. In theory, a perfectly balanced CPU resource allocation strategy meets two conditions: first, the real time demands for the CPU resources by each process group is met; second, each CPU has a most similar usage rate. A best CPU resource allocation strategy meets both of the above described two conditions.

Taking the mean-square error standard for example, a mean-square error can represent the usage rates for each CPU, and indicate the dynamic balancing effect of an allocation strategy. An exemplary formula is $$mse = \frac{\sum_{i=0}^{n}(\overline{V} - V_i)^2}{n},$$

where n is the number of CPUs, $V_i = T_i/T$, $T_i$ being the ith CPU's execution time during the pre-configured period of time, $V_i$ is the ith CPU's usage rate during the pre-configured T period of time, $$\overline{V} = \frac{\sum_{i=0}^{n} V_i}{n},$$

the nth CPU's average usage rate, and mse is the mean-square error value.

In theory, there exists a strategy $mse_{min}$ out of all the CPU resource allocation strategies which has the smallest mean-square error value computed by the above described formula, $mse_{min}$ corresponding to the best solution strategy meeting the two above described conditions. In practice, constrained by the concerns of efficiency, it is not likely that all the possible CPU resource allocation strategies are to be computed and analyzed. Therefore, the present disclosure provides for an implementation that approximates the best solution CPU allocation strategy.

Figure 2:
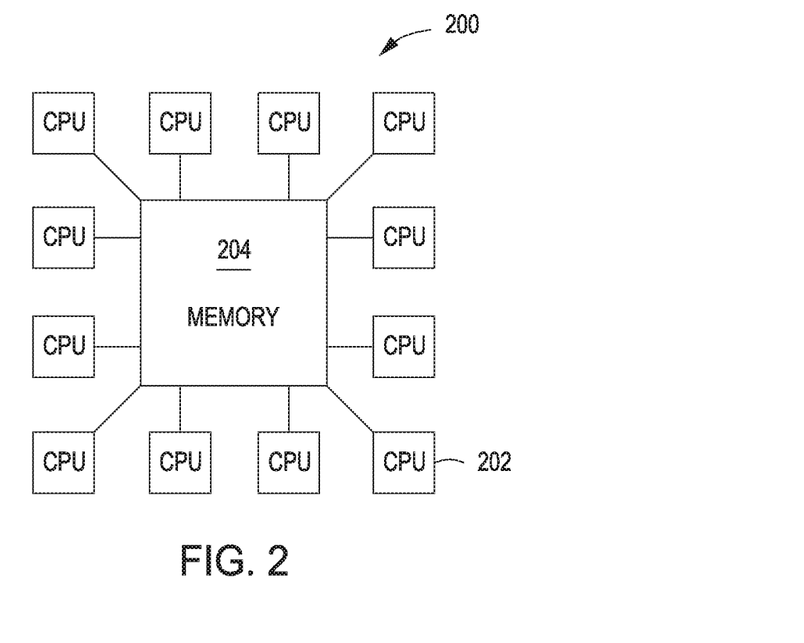
FIG. 2 is an illustration of a multi-processor device of the method of allocating CUP resources.

Referring to FIG. 2, an illustration of a multi-processor device used by the method of allocating CPU resources is shown. A multi-processor device 200 refers to a device comprising two or more processors 204 with similar processing capacity, the processors exchanging data among each other, sharing a memory 202, I/O devices, controllers, peripheral devices, etc. The hardware system of device 200 is controlled by a central operating system which realizes parallel processing on top of the processors and programs at the levels of processes, tasks, programs, data structures and other computation components. By use of a multitude of processors, the device 200 achieves enhanced reliability and processing power.

The multi-processor device 200 includes, but not limited to, a computer workstation, a terminal device such as a PDA (Personal Digital Assistant), iPad, iPhone, and smartphone having multiple processors, as well as a mobile device such as a mobile communication device having multiple processors. Taking a computing workstation for example, a multi-processor architecture has become the main stream design for computing workstations of all performance levels. A high performance personal computer can have 2 to 4 processors; a moderate performance computing workstation can have more than 10 processors; and a high performance computation workstation can have hundreds, thousands or tens of thousands of processors.

Multi-processor devices are designed for parallel processing, a computation algorithm by which a computer system executes two or more processors in parallel. Processors of such a system can execute different processes or tasks from a same program. For example, to shorten the completion time solving complex problems of large scales, a program is prepared for executing in a parallel processing system. In other words, the program is divided into different tasks for execution by different processors. After the preparation, the tasks of the program correspond to their respective processes during the execution. A multi-processor device assigns the processes of related operations as one process group, as a result of which the above described program corresponds to one process group. By use of the technology of parallel processing, the speed of a program executing on n processors can be as n times faster as executing on a single processor of similar processing power.

In addition to executing the different tasks of one program by the above described multi-processor device, the device can also execute different programs in parallel, each of the programs corresponding to its respective process group. Therefore, a multi-processor device operates in an environment of parallel processes, each of which shares the hardware resources of the multi-processor device.

Processes mentioned above refer to the basic components of an operating system, i.e., the execution of a program, or a collection of activities of a program and its data while executing in its programmed order. Since multiple programs in execution share resources, there exist potential constraints among the programs during the execution, which causes symptoms such as interrupted or paused execution of the programs. Those symptoms occur during the execution of the programs, which is a dynamic process. However, a conventional program is a collection of commands, a static set without any notion regarding how the program is executed in the memory. In other words, it cannot be determined from the code of a program with regard to when it will be executed, or when its execution will be paused, or what is the inter-relationship with other programs being executed in parallel. Therefore, static program code does not reflect the characteristics associated with its execution in parallel processing. To describe the dynamic aspects of a program in execution, the concept of process is introduced.

Process groups mentioned above refer to a group of processes including one or more processes. Processes relating to an operation are assigned as one process group. Because a multi-processor device can execute various programs at the same time, each of the programs corresponds to one process group. To achieve isolation among the programs, the present disclosure allocates CPU resources in the unit of process groups such that the CPU resources can be isolated among the programs.

The present disclosure provides a method of allocating CPU resources for each of the process groups executing on a multi-processor device based on the amount of demanded CPU resources by each process group during a pre-configured time period, and the amount of idle CPU time of each CPU of the multi-processor device during the pre-configured time period. Therefore, both the amount of demanded CPU resources by each process group during the pre-configured time period and the amount of idle CPU time of each CPU of the multi-processor device during the pre-configured time period need to be obtained first.

The amount of demanded CPU resources for a process group during a pre-configured time period refers to the sum of execution time by the process group on each CPU of a multi-processor device during a pre-configured time period. The pre-configured time period is a pre-configured time period during which the CPU execution conditions are monitored. The pre-configured time period is related to the time interval at which CPU resource allocation is initiated. If the time period is short, the CPU resource allocation time interval is shorter accordingly. Otherwise, the longer the pre-configured time period is, the longer the CPU allocation time interval. In implementations, the time period can be determined based on requirements under the circumstances.

Figure 3:
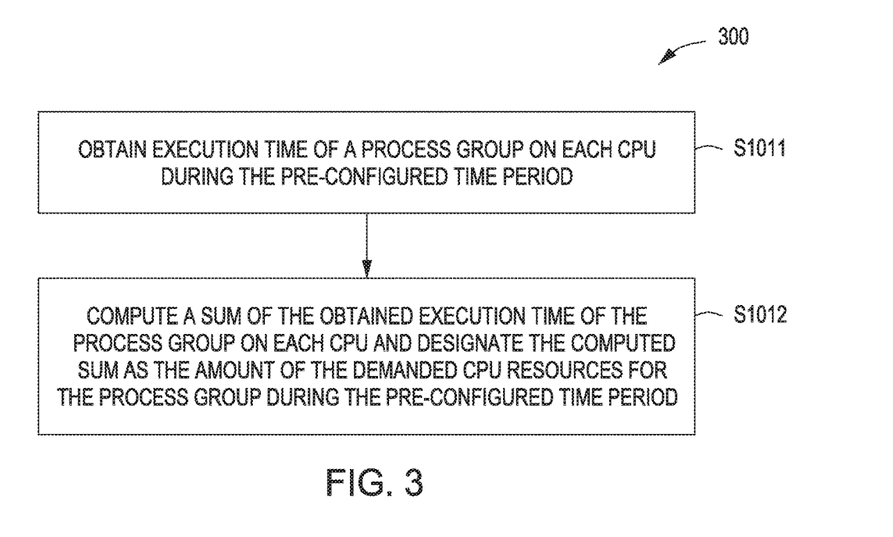
FIG. 3 is a flow chart of obtaining the amount of demanded CPU resources for a process group during a pre-configured time period in accordance with embodiments of the present disclosure.

Referring to FIG. 3, a flow chart of obtaining the amount of demanded CPU resources for a process group during a pre-configured time period is shown in accordance with embodiments of the present disclosure. The method 300 starts in step S1011, where the execution time of a process group on each CPU during the pre-configured time period is obtained. To obtain the amount of demanded CPU resources for the process group during the pre-configured time period, data of execution time on each CPU is obtained for the process group. Through the monitoring tools provided by the operating system of a multi-processor device, the execution time by each process group on each CPU during the pre-configured time period can be obtained. Take a Linux system for example, even though by default the system does not provide a tool to directly obtain the execution time by each process group on each CPU, the execution time can be obtained by use of the kernel patching approach.

In some embodiments, the execution time of a process group on each CPU can be obtained by use of the cpuacct.usage_per_cpu under cgroups. Cgroups stands for "control groups," a Linux kernel feature for limiting, accounting for and isolating the physical resources such as CPU, memory, disk I/O, network, etc. of process groups. Cgroups is also a resource management mechanism of LXC (Linux Container) for resource virtualization, an essential component of LCX systems.

With the process group's execution time on each CPU during the pre-configured time period obtained in step S1011, in step S1012, a sum of the process group's execution time on each CPU during the pre-configured time period is computed as the amount of demanded CPU resources by the process group during the pre-configured time period.

Figure 4:
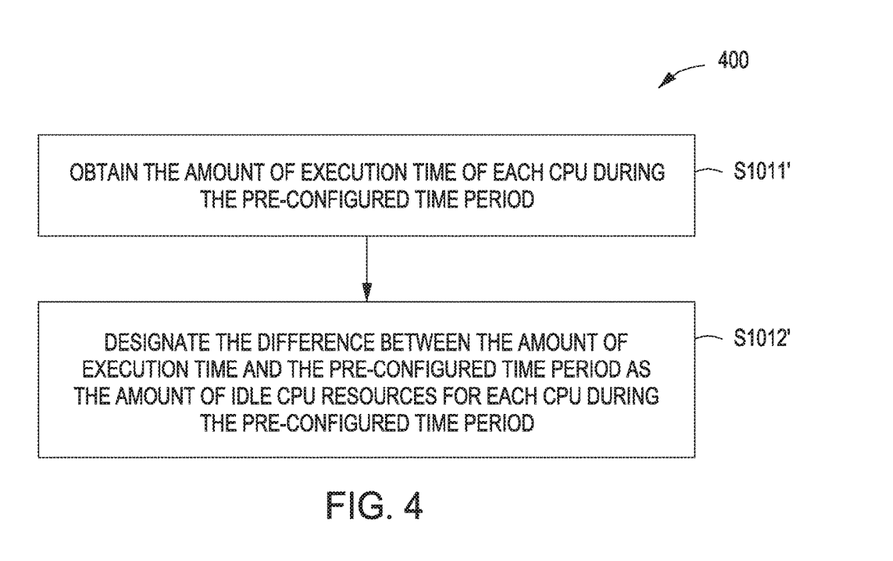
FIG. 4 is a flow chart of obtaining the amount of idle CPU resources for a CPU during a pre-configured time period in accordance with embodiments of the present disclosure.

The present idle CPU resources for a CPU during a pre-configured time period refers to the amount of time the CPU remains idle during the pre-configured time period. Referring to FIG. 4, a flow chart of obtaining the amount of idle CPU resources by the CPU resource allocating method is shown in accordance with embodiments of the present disclosure. Method 400 starts in step S1011', where the execution time of a CPU during a pre-configured time period is obtained. Taking a Linux system for example, the Linux operating system by default provides a functionality monitoring tool, by use of which each CPU's execution time during a pre-configured time period can be obtained. Monitoring tools include, but not limited to, utilities such as vmstat, ps, top, etc. The vmstat command reports about the statistical information regarding the kernel threads, virtual memory, disk, traps, as well as CPU activities. Reports generated by use of the command vmstat can be used to balance system workloads. The ps and top commands are among the most often utilized commands for system monitoring—the ps command reports a list of processes in execution, the number of the processes listed determined by the parameter specified for the command. For example, the command "ps-A" will report all the processes in execution and their respective process IDs (PIDs), which are the parameters that need to be specified for other commands such as pmap or renice.

In step S1012', method 400 computes a difference between the length of the pre-configured time period and the execution time of a CPU as the CPU idle time during the pre-configured time period. In some embodiments, the amount of idle CPU resources is computed with the formula $T_{2j}=T-T_{1j}$, T being the pre-configured time period, $T_{1j}$ being the processor $P_j$ execution time during the pre-configured T time period, and $T_{2j}$ being the processor $P_j$ idle time during the pre-configured T time period.

Figure 5:
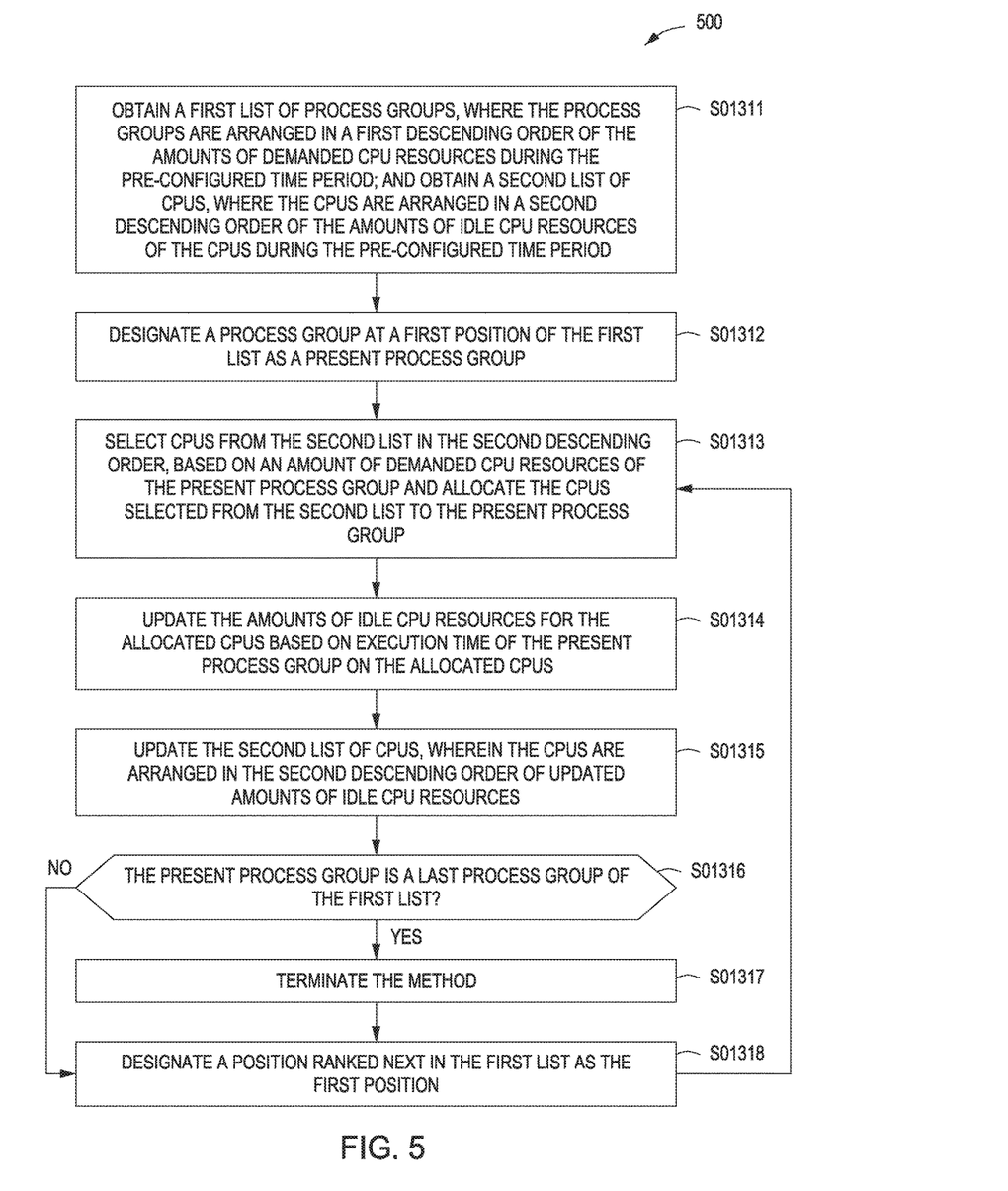
FIG. 5 is a flow chart of the step S104 of FIG. 1B in accordance with embodiments of the present disclosure.

Referring to FIG. 5, a flow chart of the step S104 of FIG. 1B is shown in accordance with embodiments of the present disclosure. Method 500 starts in step S10311, where the process groups are arranged in a process group list in descending order of the obtained amount of demanded CPU resources for each process group during the pre-configured time period. Based on the amount of idle CPU resources for each CPU during the pre-configured time period, the CPUs are also arranged in a CPU list in a descending order of the amount of idle CPU resources.

The present disclosure provides dynamic CPU resource allocation for the process groups executing on a multi-process device. The CPU resources are allocated to each process group based on the descending order of the amount of demanded CPU resources for the process group during a pre-configured time period. In practice, when CPU resources are allocated for a process group, the demanded number of CPUs for the process group are allocated from the CPU list in a descending order of the amount of idle CPU resources. Therefore, 1) a process group list in a descending order of the amount of demanded CPU resources and 2) a CPU list in a descending order of the amount of idle CPU resources are obtained first.

After obtaining the process group list and the CPU list in step S10311, method 500 proceeds to step S10312, where a process group arranged at the first position in the process group list is designated as a present process group. In step S10133, based on the amount of demanded CPU resources by the present process group and starting from the CPU arranged at the first position in the CPU list, the demanded number of CPUs are selected from the CPU list in the descending order of the list and allocated to the present process group.

In implementations, CPU resources are allocated to a process group following the descending order of the CPU list, i.e., CPUs having a larger amount of idle CPU resources are selected and allocated prior to those having a smaller amount of idle CPU resources.

In step S10314, based on the execution time of the present process group on each CPU, the amount of idle CPU resources are updated for the allocated CPUs. After the demanded number of CPUs are allocated to the present process group, the amount of idle CPU time of the allocated CPUs changes accordingly. Therefore, it is necessary to update the amount of idle CPU resources for the allocated CPUs based on the execution time for the present process group on each CPU. The obtaining of the execution time for a process group on each CPU is substantially similar to the above described step S1011 and details are not repeated for the purpose of simplicity.

In step S10315, the CPU list is re-arranged in a descending order of the updated amount of idle CPU resources. After allocating the CPU resources for the present process group, the CPU resources need to be allocated for the next process group in the process group list. It is necessary to utilize the amounts of idle CPU resources updated for the newly allocated CPUs in the step S10314 and the amounts of idle CPU resources that remain unchanged for the CPUs not allocated to the present process group to re-arrange the CPU list in a descending order such that the CPUs with the largest amount of available resources can always be allocated first to the corresponding process groups in the process group list.

In step S10316, it is determined whether the present process group is the last process group in the process group list. Prior to allocating CPU resources for the next process group in the process group list, it is first determined whether the process group for which the CPU resources are presently allocated is the last one in the process group list. If it is determined that the present process group is the last one in the list, method 500 proceeds to the step S10317 to conclude allocating CPU resources for the process groups. Otherwise, method 500 proceeds to the step S10318 to determine which process group is the next to allocate CPU resources for, and continue back to the step S10313 to allocate CPU resources for the determined next process group.

In step S10318, the next process group in the process group list is determined as the present process group. Method 500 continues back to the step S1031, where based on the amount of demanded CPU resources by the present process group and starting from the CPU arranged at the first position in the CPU list, the demanded number of CPUs are selected from the CPU list in the descending order of the list and allocated to the present process group.

Referring back to FIG. 1B, after the steps S10311 through S10318 where a CPU resource allocation strategy is generated, method 150 proceeds to the step S105 to deploy the CPU allocation strategy. In the step S105, each process group is pinned to its respectively allocated CPUs according to the generated CPU resource allocation strategy. Taking a Linux system for example, by use of the commands such as taskset, cpuset sub-system of the cgroups feature, nice and renice, etc., a process group can be pinned to one or more CPUs. With the command taskset, an exemplary command of "taskset-C<cpunr><command>" can be utilized to initiate the designating of one or more CPUs for executing a particular process. With the cpuset sub-system of the cgroups feature, an exemplary command of "#echo 0, 2, 4, 6>/cgroup/<process group name>/cpuset.cpus" can be utilized to specify the CPU numbers of the CPUs designated for a particular process group, i.e., the process group can only be executed on the CPUs numbered 0, 2, 4, or 6.

In some embodiments, a CPU resource allocation strategy includes a mapping relationship between each process group and its respective CPU resources. According to the strategy, each process group is pinned to its respectively allocated CPUs such that to complete the provisioning of the CPU allocation strategy.

In some other embodiments, the provisioning of a CPU resource allocation strategy pins the allocated CPUs to one process group by use of the provisioning tools immediately upon the resource allocation for the process group is determined. Afterwards, the provisioning is performed for the other process group one by one. The difference between the two approaches of provisioning is in the timing when a process group is pinned to its allocated CPUs; other aspects are substantially similar and therefore the details are not repeated here.

In order for the present disclosure to provide for dynamic allocation of CPU resources, dynamic characteristics of the execution of each process on a multi-processor device need to be taken into consideration. One way to consider the dynamics of the execution conditions of a multi-processor device is to pre-configure execution conditions that trigger the method of allocating CPU resources. When the pre-configured execution conditions are met, CPU resources are allocated. Various execution conditions for triggering CPU resource allocation can be configured; four exemplary conditions are illustrated in the following.

First, an execution condition can be that the time lapse between the present and the last time of the allocation of CPU resources is greater than a pre-configured time interval. Under this execution condition, the CPU resource allocation is executed at a fixed time interval such that a multi-processor device is in a state of generally balanced CPU usage. In practice, such time intervals can be configured in the unit of minutes, e.g., between 1 to 5 minutes.

Second, an execution condition can be that the maximal CPU usage of each CPU exceeds a pre-configured threshold value. Under this execution condition, if it is determined that the maximal value of CPU usage of each CPU exceeds a pre-configured threshold value, the condition for executing CPU allocation is met. This execution condition provides for a condition to execute CPU resource allocation at unfixed time intervals. To avoid unnecessary CPU resource balancing and to guarantee a certain degree of sensitivity to the execution condition, the pre-configured threshold value needs to be configured at a suitable value.

In some embodiments, the pre-configured threshold value is determined based on a large amount of experimentation. The pre-configured threshold value indicates that a CPU is at or close to its full workload capacity, therefore it is the time to balance or re-balance the CPU resources. For a hyper-threaded multi-processor device, the threshold can be configured at around 60%; otherwise, the threshold can be configured at around 80%.

Third, an execution condition can be that the maximal of the CPU usage rate of each CPU exceeds N times of the minimal of the CPU usage rate of each CPU. Under this execution condition, if it is determined that the maximal CPU usage rate of each CPU exceeds N times the minimal of the CPU usage rate of each CPU, the execution condition is met.

Fourth, an execution condition can be that the maximal CPU usage rate of each CPU exceeds a pre-configured threshold value, and the maximal CPU usage rate of each CPU exceeds N times of the minimal CPU usage rate of each CPU. Under this execution condition, when both the second and the third execution conditions are met, the fourth condition is considered met.

In practice, one of the above described exemplary execution conditions can be selected under the circumstances. The first exemplary execution condition triggers the execution of CPU resource allocation at a fixed time interval; the second, third and fourth execution conditions trigger the execution of CPU resource allocation at unfixed time intervals according to the execution condition of the multi-processor device. In other words, there still exists a state of imbalanced CPU usage. But, if there is no imbalance of CPU resource detected in the device, all the demanded CPU resources by each program executing on the device are met, therefore the execution and operation of the programs are guaranteed, no need for balancing the usage of CPU resources.

In some embodiments, under the fourth execution condition, a CPU shared by multiple process groups has a maximal CPU usage rate of x, a minimal CPU usage rate of y. When x exceeds a pre-configured threshold value and when x>n*y, the fourth condition is triggered to execution CPU resource allocation. For example, the number n can be configured as 2, i.e., when the maximal CPU usage rate is greater than twice the value of the minimal CPU usage rate, currently there is imbalanced CPU resource allocation.

The above described embodiments provide for a method of CPU resource allocation, correspondingly, the present disclosure further provides for an apparatus for CPU resource allocation.

Figure 6:
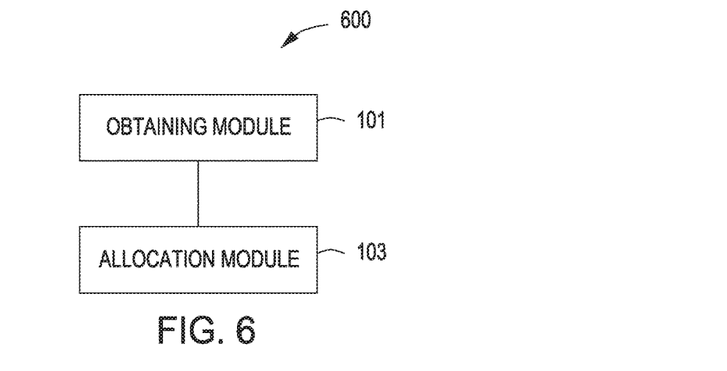
FIG. 6 is a block diagram of an apparatus for allocating CPU resources in accordance with embodiments of the present disclosure.

Referring to FIG. 6, a block diagram of an apparatus for allocating CPU resources in accordance with embodiments of the present disclosure is shown. The apparatus 600 is substantially similar to the above described method and the details are not repeated here for the purpose of simplicity.

The apparatus 600 includes an obtaining module 101 and an allocation module 103. The obtaining module 101 is configured to obtain the amount of demanded CPU resources for each progress group executing on a multi-processor device during a pre-configured time period, and the amount of idle CPU resources for each CPU of the multi-processor device during the pre-configured time period. The allocation module 103 is configured to allocate CPUs to each progress group based upon the obtained amount of demanded CPU resources for the process group and the obtained amount of idle CPU resources for the CPUs.

Figure 7:
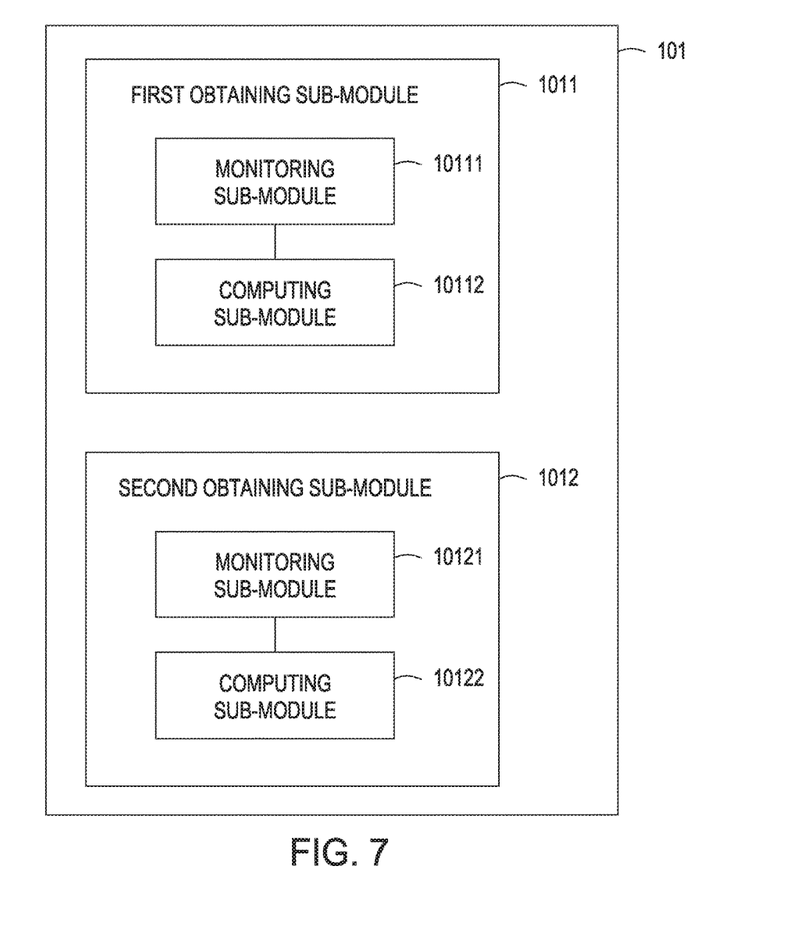
FIG. 7 is a block diagram of the obtaining module 101 of the apparatus of FIG. 6 in accordance with embodiments of the present disclosure.

Referring to FIG. 7, a block diagram of the obtaining module 101 of the apparatus 600 of FIG. 6 is shown in accordance with embodiments of the present disclosure. The obtaining module 101 can include a first obtaining sub-module 1011 and a second obtaining sub-module 1012. The first obtaining sub-module 1011 includes a monitoring sub-module 10111 and a computing sub-module 10112. The monitoring sub-module 10111 is configured to obtain the execution time of each process group on each CPU during the pre-configured time period. The computing sub-module 10112 is configured to compute a sum of the execution time of each process group on each CPU of the multi-processor device during the pre-configured time period and to designate the sum as the amount of demanded CPU resources for each process group during the pre-configured time period. The second obtaining sub-module 1012 is configured to obtain the amount of idle CPU resources for each CPU of the multi-processor device during the pre-configured time period. The second obtaining sub-module 1012 includes a monitoring sub-module 10121 and a computing sub-module 10122. The monitoring sub-module 10121 is configured to obtain the execution time of each CPU of the multi-processor device during the pre-configured time period. The computing sub-module 10122 is configured to compute the difference between the length of the pre-configured time period and the obtained execution time of each CPU and to designate the difference as the amount of idle CPU resources for each CPU during the pre-configured time period.

Figure 8:
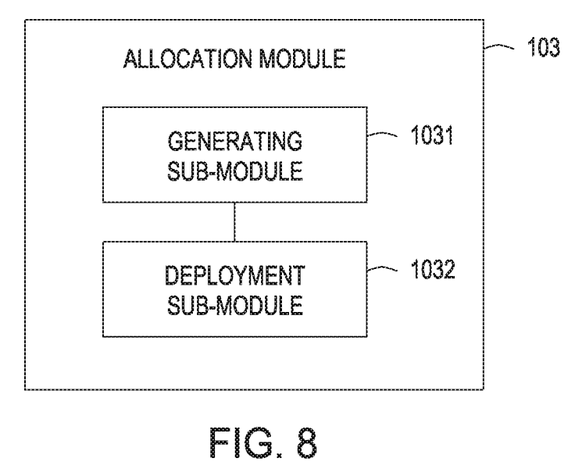
FIG. 8 is a block diagram of the allocation module 103 of the apparatus of FIG. 6 in accordance with embodiments of the present disclosure.

Referring to FIG. 8, a block diagram of the allocation module 103 of the apparatus 600 is shown in accordance with embodiments of the present disclosure. The allocation module 103 includes a generating sub-module 1031 and a deployment sub-module 1032. The generating sub-module 1031 is configured to generate a strategy for allocating CPU resources based upon the obtained amount of demanded CPU resources for each process group and the obtained amount of idle CPU resources for each CPU. The deployment sub-module 1032 is configured to deploy the CPU resources allocated in the strategy by pinning each process group to the respectively allocated CPUs.

Figure 9:
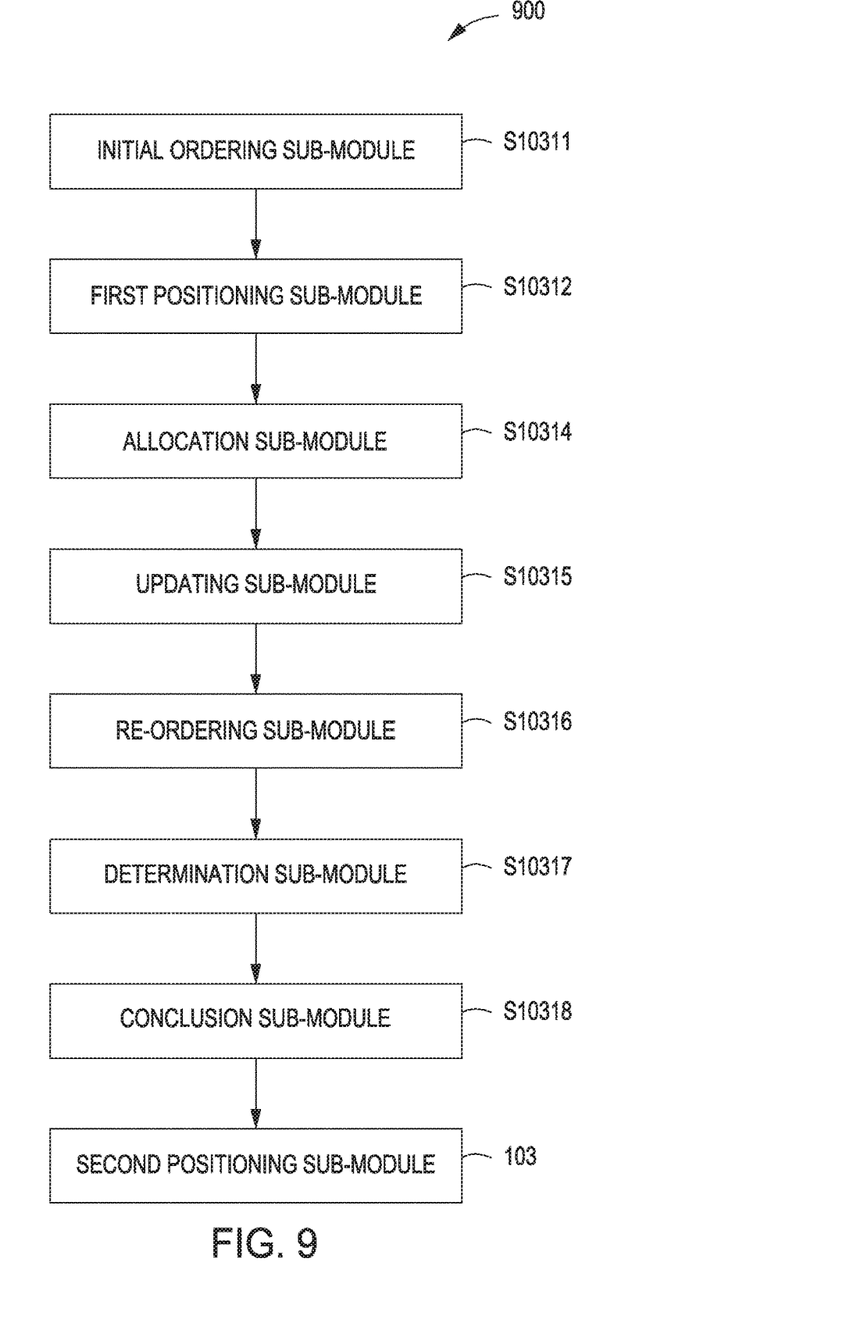
FIG. 9 is a block diagram of the generating sub-module 1031 of the apparatus of FIG. 8 in accordance with embodiments of the present disclosure.

Referring to FIG. 9, a block diagram of the generating sub-module 1031 of FIG. 8 is shown in accordance with embodiments of the present disclosure. The generating sub-module 1031 includes an initial ordering sub-module 10311, a first positioning sub-module 10312, an allocation sub-module 10313, an updating sub-module 10314, a re-ordering sub-module 10315, a determination sub-module 10316, a concluding sub-module 10317 and a second positioning sub-module 10318.

The initial ordering sub-module 10311 is configured to obtain a first list of process groups, where the process groups are arranged in a first descending order of the amount of demanded CPU resources of each process group during the pre-configured time period. The initial ordering sub-module 10311 is also configured to obtain a second list of CPUs, where the CPUs are arranged in a second descending order of the amount of idle CPU resources of each CPU during the pre-configured time period.

The first positioning sub-module 10312 is configured to designate a process group at the first position of the first list as the present process group. The allocation sub-module 10313 is configured to select from the second list, based on the amount of demanded CPU resources of the present process group, the amount of demanded CPUs in the first descending order. The updating sub-module 10314 is configured to update the amounts of idle CPU resources for the allocated CPUs based on execution time of the present process group on each CPU. The re-ordering sub-module 10315 is configured to update the second list of CPUs, where the CPUs are arranged in the second descending order of updated amounts of idle CPU resources. The determination sub-module 10316 is configured to determine whether the present process group is the last process group of the first list. The concluding sub-module 10317 is configured to, in response to a determination that the present process group is the last process group of the first list, terminate the allocating of CPU resources. The second positioning sub-module 10318 is configured to, in response to a determination that the present process group is not the last process group of the first list, designate the position ranked next in the first list as the first position and initiate the execution of the first positioning sub-module 10312 such that to allocate CPU resources for the next process group, starting at designating the process group at the first position of the first list as the present process group.

Figure 10:
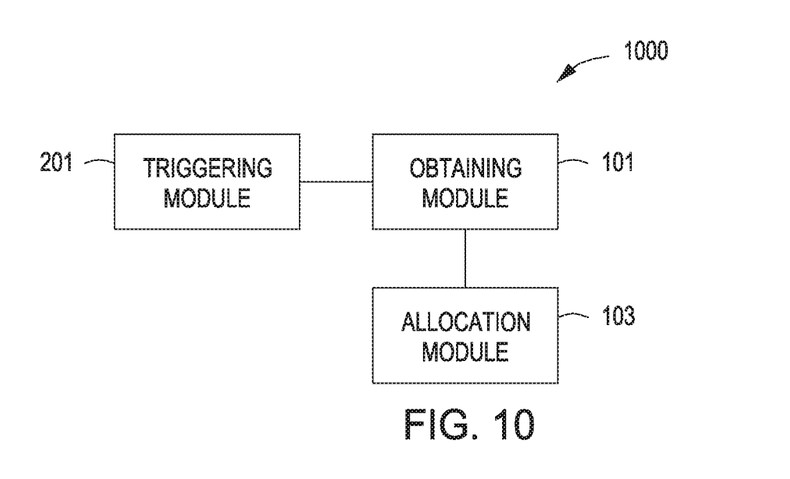
FIG. 10 is a block diagram of another apparatus for allocating CPU resources in accordance with embodiments of the present disclosure.

Referring to FIG. 10, a block diagram of another apparatus for allocating CPU resources is shown in accordance with embodiments of the present disclosure. The apparatus 1000 includes a triggering module 201 in addition the obtaining module 101 and the allocation module 103. The triggering module 201 is configured to execute the allocation of CPU resources by the apparatus 1000 when a pre-configured condition is met.

Figure 11:
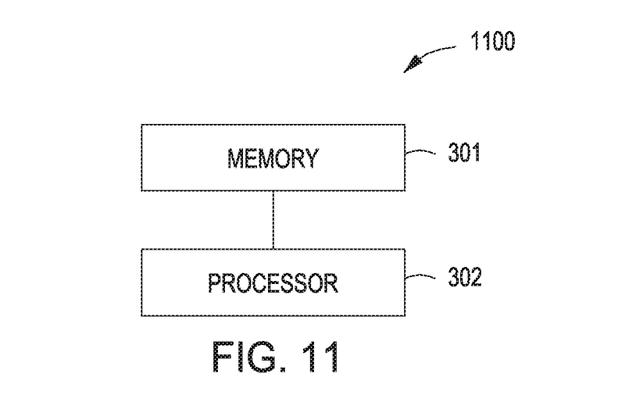
FIG. 11 is a block diagram of an electronic device for allocating CPU resources in accordance with embodiments of the present disclosure.

Referring to FIG. 11, a block diagram of an electronic device for allocating CPU resources is shown in accordance with embodiments of the present disclosure. The device 1100 includes a memory 301 and a plurality of processors 302. A plurality of process groups execute on the processors 302. The CPU resources are allocated to each of the process groups executing on the plurality of processors 302 by obtaining the amount of demanded CPU resources for each progress group executing on the device 1100 during a pre-configured time period. The allocation also includes obtaining the amount of idle CPU resources for each CPU of the device 1100 during the pre-configured time period. The allocation further includes allocating the CPU resources to each progress group based upon the obtained amount of demanded CPU resources for the process group and the obtained amount of idle CPU resources for each CPU during the pre-configured time period.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of allocating processors in a multi-processor device, the method comprising:
   executing a plurality of process groups on a plurality of CPUs such that a process group is executed on the plurality of CPUs;
   determining a plurality of process group execution times for the plurality of process groups such that a process group execution time is determined for the process group, the process group execution time of the process group indicating how long the process group was executing on the plurality of CPUs during a measurement time;
   determining a plurality of idle times for the plurality of CPUs such that an idle time is determined for a CPU, the idle time of the CPU indicating how long the CPU was idle during the measurement time; and
   allocating whichever CPU has the largest idle time of the plurality of idle times of the plurality of CPUs to whichever process group has the largest process group execution time of the plurality of process group execution times of the plurality of process groups.

2. The method of claim 1, wherein the process group execution time of the process group is a sum of a plurality of local execution times of the plurality of CPUs.

3. The method of claim 1, wherein determining a plurality of process group execution times includes:
   obtaining a plurality of local execution times for the plurality of CPUs such that a local execution time is obtained for the CPU, the local execution time of the CPU indicating how long the process group was executing on the CPU during the measurement time; and
   summing the plurality of local execution times to generate the process group execution time of the process group.

4. The method of claim 3, wherein obtaining a plurality of local execution times includes reading a value from cpuacct.usage_per_cpu under cgroups to obtain an execution time of the CPUs.

5. The method of claim 3, wherein the idle time of the CPU is the measurement time less the local execution time of the CPU.

6. The method of claim 5, wherein determining a plurality of process group execution times further includes generating an execution list of the plurality of process group execution times in a descending order of execution time.

7. The method of claim 6, wherein determining a plurality of idle times includes generating an idle list of the plurality of idle times in a descending order of idle time.

8. The method of claim 7, wherein allocating whichever CPU includes allocating a CPU at the top of the idle list to a process group at the top of the execution list.

9. A method of central processor unit (CPU) resource allocation for a multi-processor device, the method comprising:
   obtaining amounts of demanded CPU resources for process groups executing on the multi-processor device during a pre-configured time period;
   obtaining amounts of idle CPU resources for CPUs of the multi-processor device during the pre-configured time period;
   allocating CPUs to the process groups to form designated CPUs based upon the obtained amounts of demanded CPU resources for the process groups and the obtained amounts of idle CPU resources for the CPUs, wherein the allocating CPUs to the process groups based upon the obtained amounts of demanded CPU resources for the process groups and the obtained amounts of idle CPU resources for the CPUs comprises:
   generating a strategy for allocating CPUs based upon the obtained amounts of demanded CPU resources for the process groups and the obtained amounts of idle CPU resources for the CPUs, wherein the generating a strategy for allocating CPU resources based upon the obtained amounts of demanded CPU resources for the process groups and the obtained amounts of idle CPU resources for the CPUs comprises the steps of:
   a) obtaining a first list of process groups, wherein the process groups are arranged in a first descending order of the amounts of demanded CPU resources during the pre-configured time period;
   b) obtaining a second list of CPUs, wherein the CPUs are arranged in a second descending order of the amounts of idle CPU resources of the CPUs during the pre-configured time period;
   c) designating a process group at a first position of the first list;
   d) selecting CPUs from the second list in the second descending order, based on an amount of demanded CPU resources of the process group at the first position;
   e) allocating the CPUs selected from the second list to the process group at the first position;
   f) updating the amounts of idle CPU resources for the allocated CPUs based on execution time of the process group at the first position on the allocated CPUs;
   g) updating the second list of CPUs, wherein the CPUs are arranged in the second descending order of updated amounts of idle CPU resources;
   h) determining whether the process group at the first position is a last process group of the first list;
   i) in response to a determination that the process group at the first position is the last process group of the first list, terminating the method; and
   j) in response to a determination that the process group at the first position is not the last process group of the first list, designating a position next in the first list as the first position and continuing from step d); and
   deploying the generated strategy by pinning the process groups to the designated CPUs that were allocated to the process groups.

10. The method of claim 1, further comprising:
    re-determining a plurality of process group execution times for the plurality of process groups when a predetermined condition has been met such that a process group execution time is re-determined for the process group;
    re-determining a plurality of idle times for the plurality of CPUs when the predetermined condition has been met such that an idle time is re-determined for the CPU; and
    re-allocating whichever CPU has the largest re-determined idle time to whichever process group has the largest re-determined process group execution time.

11. The method of claim 10, wherein the predetermined condition is met when a predefined time has expired.

12. The method of claim 10, wherein the predetermined condition is met when a CPU exceeds a maximum CPU usage rate.

13. The method of claim 10, wherein the predetermined condition is met when a CPU usage rate exceeds N times a minimal CPU usage rate, N being an integer.

14. The method of claim 10, wherein the predetermined condition is met when a CPU exceeds a maximum CPU usage rate, and when the CPU usage rate exceeds N times a minimal CPU usage rate, N being an integer.

15. A computer program product tangibly embodied in a non-transitory computer-readable storage device and comprising instructions that when executed by a processor perform a method for allocating processors in a multi-processor device, the method comprising:
   executing a plurality of process groups on a plurality of CPUs such that a process group is executed on the plurality of CPUs;
   determining a plurality of process group execution times for the plurality of process groups such that a process group execution time is determined for the process group, the process group execution time of the process group indicating how long the process group was executing on the plurality of CPUs during a measurement time;
   determining a plurality of idle times for the plurality of CPUs such that an idle time is determined for a CPU, the idle time of the CPU indicating how long the CPU was idle during the measurement time; and
   allocating whichever CPU has the largest idle time of the plurality of idle times of the plurality of CPUs to whichever process group has the largest process group execution time of the plurality of process group execution times of the plurality of process groups.

16. The product of claim 15, wherein determining a plurality of process group execution times includes:
   obtaining a plurality of local execution times for the plurality of CPUs such that a local execution time is obtained for the CPU, the local execution time of the CPU indicating how long the process group was executing on the CPU during the measurement time; and
   summing the plurality of local execution times to generate the process group execution time of the process group.

17. The product of claim 16, wherein the idle time of the CPU is the measurement time less the local execution time of the CPU.

18. The product of claim 15, wherein:
   determining a plurality of process group execution times includes generating an execution list of the plurality of process group execution times in a descending order of execution time;
   determining a plurality of idle times includes generating an idle list of the plurality of idle times in a descending order of idle time; and
   allocating whichever CPU includes allocating a CPU at the top of the idle list to a process group at the top of the execution list.

19. An apparatus for allocating CPU resources, the apparatus comprising:
   a processor; and
   a non-transitory computer-readable medium operably coupled to the processor, the non-transitory computer-readable medium having computer-readable instructions stored thereon to be executed when accessed by the processor, the instructions comprising:
   an obtaining module configured to obtain amounts of demanded CPU resources for process groups executing on the multi-processor device during a pre-configured time period and to obtain amounts of idle CPU resources for CPUs of the multi-processor device during the pre-configured time period; and
   an allocation module configured to allocate CPUs to the process groups to form designated CPUs based upon the obtained amounts of demanded CPU resources for the process groups and the obtained amounts of idle CPU resources for the CPUs, the allocation module comprising:
      a generating sub-module configured to generate a strategy for allocating CPU resources based upon the obtained amounts of demanded CPU resources for the process groups and the obtained amounts of idle CPU resources for the CPUs, the generating sub-module comprising:
         an initial ordering sub-module configured to obtain a first list of process groups and to obtain a second list of CPUs, wherein the process groups are arranged in a first descending order of the amounts of demanded CPU resources during the pre-configured time period, and wherein the CPUs are arranged in a second descending order of the amounts of idle CPU resources of the CPUs during the pre-configured time period;
         a first positioning sub-module configured to designate a process group at a first position of the first list a process group;
         an allocation sub-module configured to select CPUs from the second list in the second descending order, based on an amount of demanded CPU resources of the process group at the first position, and to allocate the CPUs selected from the second list to the process group at the first position;
         an updating sub-module configured to update the amounts of idle CPU resources for the allocated CPUs based on execution time of the process group at the first position on the allocated CPUs;
         an re-ordering sub-module configured to update the second list of CPUs, wherein the CPUs are arranged in the second descending order of updated amounts of idle CPU resources;
         a determination sub-module configured to determine whether the process group at the first position is a last process group of the first list;
         a conclusion sub-module configured to, in response to a determination that the process group at the first position is the last process group of the first list, terminating the method; and
         a second positioning sub-module configured to, in response to a determination that the process group at the first position is not the last process group of the first list, designate a position next in the first list as the first position and execute the first positioning allocation sub-module; and
      a deployment sub-module configured to deploy the generated strategy by pinning the process groups to the designated CPUs that were allocated to the process groups.

20. The product of claim 15 wherein the method further includes:
   re-determining a plurality of process group execution times for the plurality of process groups when a predetermined condition has been met such that a process group execution time is re-determined for the process group;
   re-determining a plurality of idle times for the plurality of CPUs when the predetermined condition has been met such that an idle time is re-determined for the CPU; and re-allocating whichever CPU has the largest re-determined idle time to whichever process group has the largest re-determined process group execution time.

21. An electronic device comprising:
a memory; and
a plurality of CPUs coupled to the memory, the plurality of CPUs to execute a plurality of process groups such that a process group is executed by the plurality of CPUs, a method of allocating the plurality of CPUs to the plurality of process groups comprises:
  determining a plurality of process group execution times for the plurality of process groups such that a process group execution time is determined for the process group, the process group execution time of the process group indicating how long the process group was executing on the plurality of CPUs during a measurement time;
  determining a plurality of idle times for the plurality of CPUs such that an idle time is determined for a CPU, the idle time of the CPU indicating how long the CPU was idle during the measurement time; and
allocating whichever CPU has the largest idle time of the plurality of idle times of the plurality of CPUs to whichever process group has the largest process group execution time of the plurality of process group execution times of the plurality of process groups.

* * * * *